United States Patent [19]

O'Connell et al.

[11] 4,325,136
[45] Apr. 13, 1982

[54] VIDEO DISC PLAYER HAVING CARRIAGE DRIVE APPARATUS

[75] Inventors: Philip E. O'Connell; Larry M. Hughes; James D. Fletcher, all of Indianapolis, Ind.

[73] Assignee: RCA Corporation, New York, N.Y.

[21] Appl. No.: 193,060

[22] Filed: Oct. 2, 1980

[51] Int. Cl.³ .............................................. G11B 25/04
[52] U.S. Cl. ...................................... 369/219; 369/77
[58] Field of Search .................... 369/219, 77, 223, 75

[56] References Cited

U.S. PATENT DOCUMENTS

| | | | |
|---|---|---|---|
| 2,670,210 | 2/1954 | Thompson | 369/77 |
| 4,220,339 | 9/1980 | Coleman et al. | 369/77 |
| 4,225,141 | 9/1980 | Torrington et al. | 369/77 |

Primary Examiner—Steven L. Stephan
Attorney, Agent, or Firm—E. M. Whitacre; J. S. Tripoli; D. A. Kulkarni

[57] ABSTRACT

A stylus arm carriage is driven across the record in synchronism with the radial motion of a pickup stylus by means of a carriage drive mechanism which includes a clutch. The clutch is selectively disabled to allow motion of the carriage without hindrance by the carriage drive mechanism.

4 Claims, 8 Drawing Figures

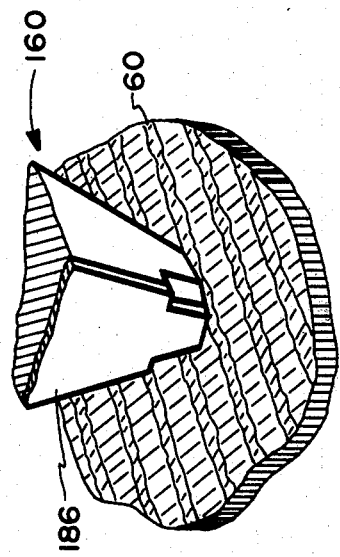
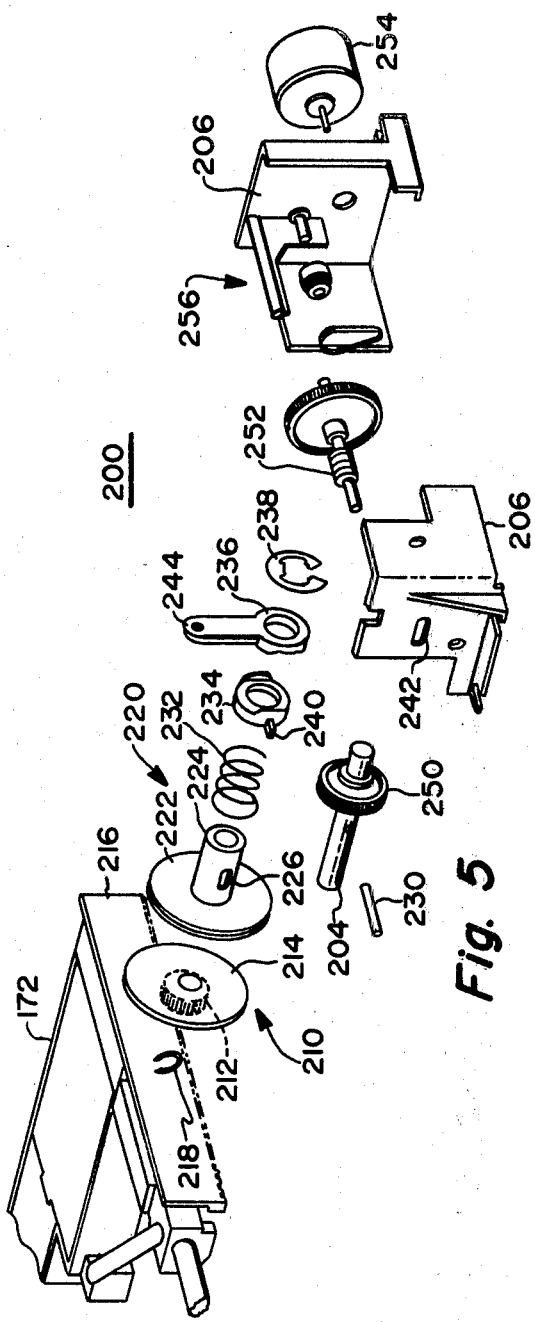
Fig. 4
Fig. 5

VIDEO DISC PLAYER HAVING CARRIAGE DRIVE APPARATUS

This invention relates to a disc record player, and more particularly, to an apparatus for translating a stylus arm carriage to follow the pickup stylus during playback.

In certain systems, video information is stored on a disc record in the form of geometric variations in a continuous spiral track disposed on the record surface. The variations in capacitance between an electrode carried by a record-engaging stylus and a conductive property of the record are sensed to reproduce the stored information. A capacitance-type pickup system is illustratively disclosed in U.S. Pat. No. 3,842,194 (Clemens).

During playback, a stylus arm carriage, carrying a pickup stylus, is traversed radially across the record toward the front of the player while a turntable rotates the record at the desired speed. Typically, in such systems, a positive drive mechanism is provided to translate the carriage in synchronism with the radial travel of the pickup stylus during playback. It is desirable to be able to selectively decouple the carriage from the drive mechanism thereof to allow the carriage movement without hindrance by the carriage drive mechanism. For example, in caddy type players, it is advantageous to disengage the carriage from its drive mechanism during insertion of an empty caddy sleeve into the player for record retrieval, since the carriage is returned to the starting position by the advancing caddy sleeve.

U.S. Pat applications, Ser. No. 964,526 and 964,643, filed, respectively, for Torrington et al and Coleman et al, describe various carriage drive systems and decoupling mechanisms therefor. In Torrington et al, the carriage is disengaged from its drive mechanism in response to the motion of a record carrying platform to its raised position prior to the insertion of an empty caddy jacket into the player for record retrieval. On the other hand, the carriage drive declutching apparatus in Coleman et al is caddy actuated.

The present application is directed toward an improved carriage drive apparatus. The subject carriage drive apparatus includes an input shaft rotatably mounted in the player. An output pulley, coupled to the carriage, is loosely mounted on the input shaft. The output pulley is provided with a first clutch half. An intermediate pulley, comprising a second clutch half which is disposed at one end of a sleeve portion, is loosely mounted on the input shaft such that the clutch halves are juxtaposed. Arranged on the sleeve portion is an elongated slot disposed in a direction parallel to the shaft. A pin, fixedly secured to the shaft, extends through the elongated slot in the sleeve portion for coupling the rotary motion of the input shaft to the intermediate pulley without interfering with the axial location of the intermediate pulley relative to the input shaft. A coil spring is disposed between the pin, secured to the shaft, and the intermediate pulley, rotatably coupled to the shaft, for urging the clutch halves in engagement with each other. The input shaft is driven by a motor to rotate at a speed such that the carriage, coupled to the output pulley, follows the pickup stylus across the record at the appropriate speed. A selectively operated member displaces the intermediate pulley in a direction causing the clutch halves to disengage to allow the motion of the carriage without hindrance from the carriage drive mechanism.

Figure 1:
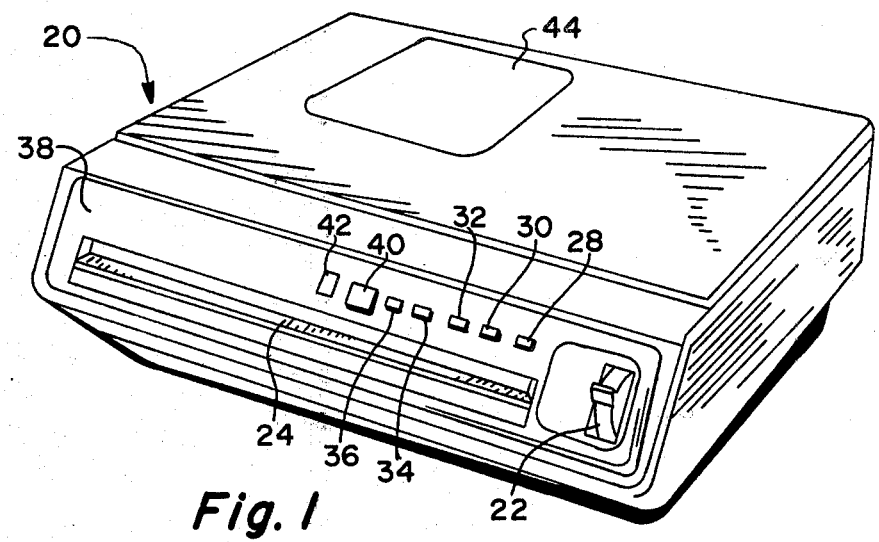
FIG. 1 shows a video disc player incorporating a carriage drive apparatus in accordance with the instant invention.
Figure 3:
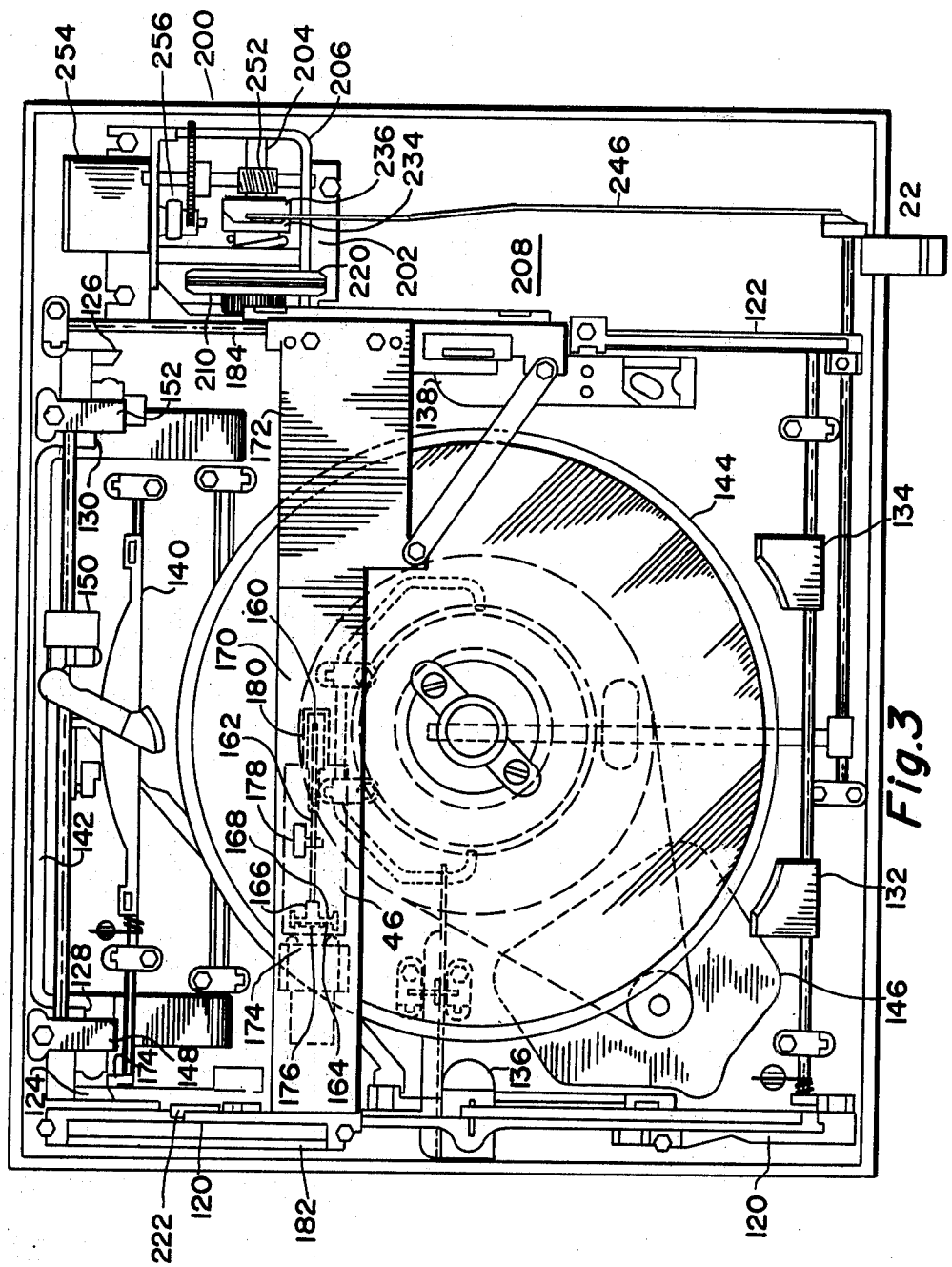
FIG. 3 provides a plan view of the player of FIG. 1 showing the interior details thereof.
Figure 6:
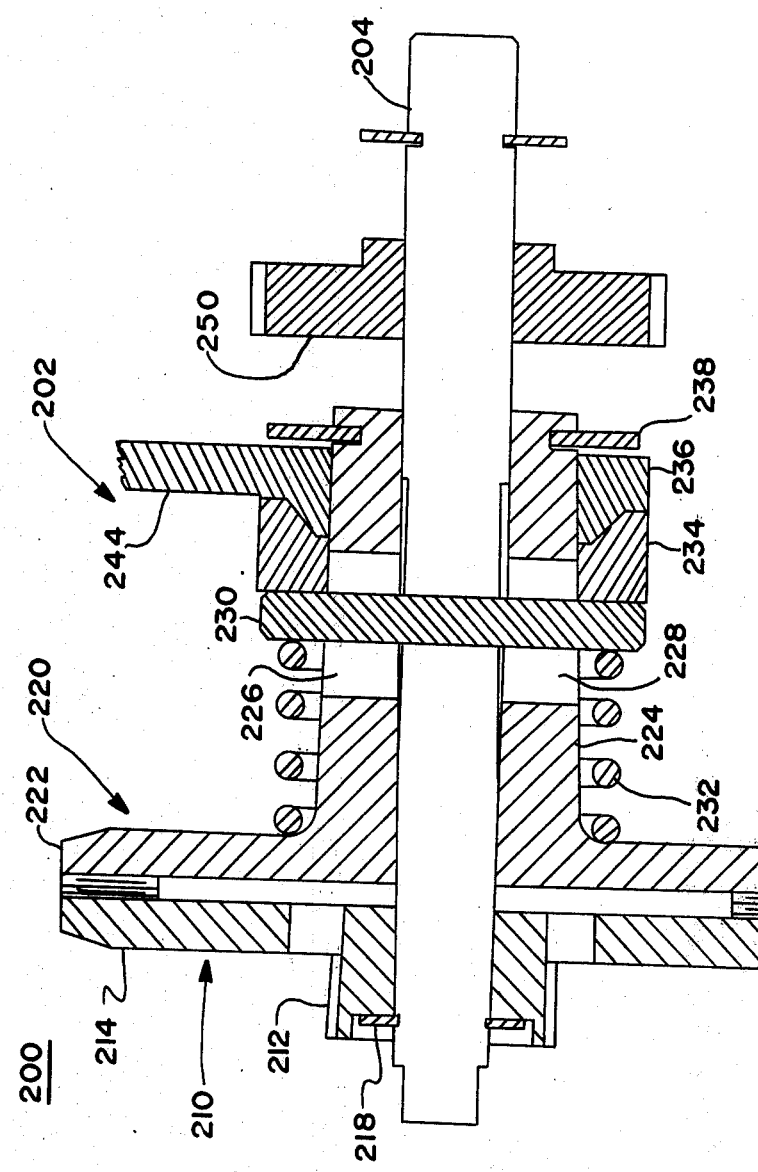

FIG. 4 schematically illustrates the capacitance pickup concept employed in the player of FIGS. 1 and 3;

FIG. 5 depicts the exploded perspective view of the carriage drive apparatus;

FIG. 6 is a sectional view of the subject carriage drive apparatus; and

Figure 7:
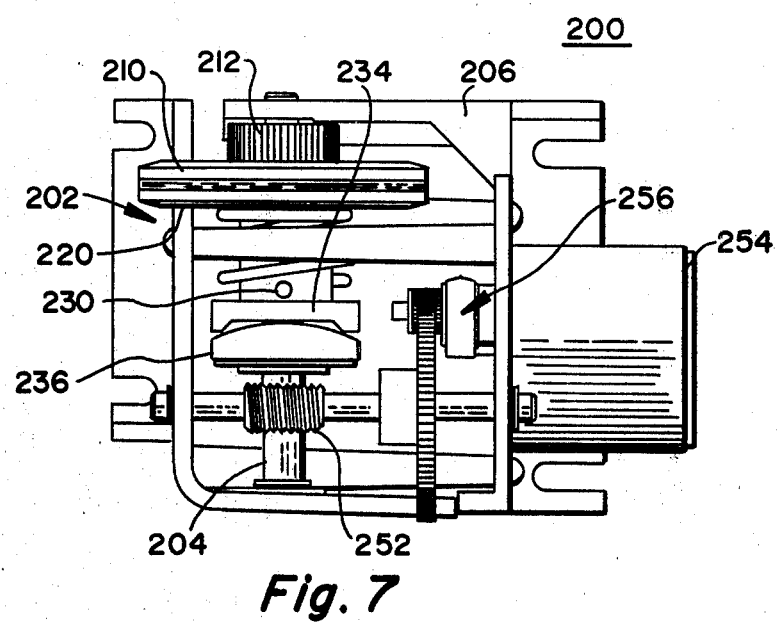
Figure 8:
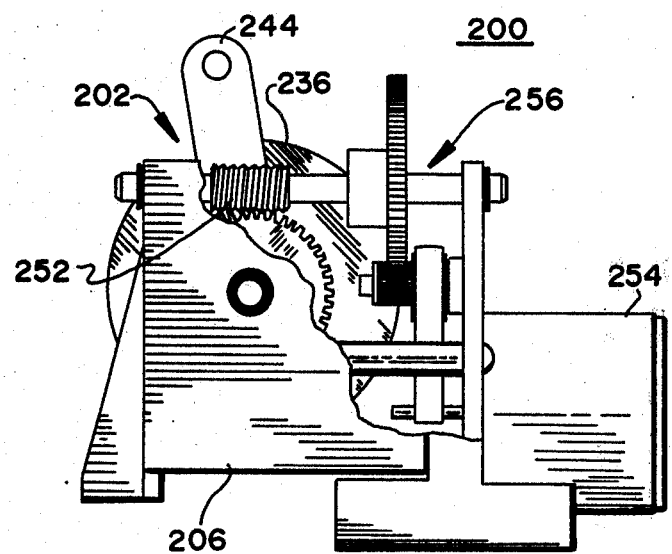

FIGS. 7 and 8 present, respectively, the top view and the side view of the instant carriage drive apparatus.

Shown in FIG. 1 is a video disc player 20 having the subject carriage drive mechanism. A function lever 22 is subject to disposition in any one of three positions—OFF, PLAY and LOAD/UNLOAD. A door flap closes a caddy input slot 24 when the function lever 22 is disposed in the OFF and PLAY positions. In the LOAD/UNLOAD position of the function lever 22, the door flap is opened to permit insertion of a caddy 26, shown in FIG. 2, into the player to load an enclosed record therein. A pushbutton 28 is provided to dispose the player in the "PAUSE" mode. A set of pushbuttons 30, 32, 34 and 36 are arranged on the instrument panel 38 to dispose the player in any one of four "SEARCH" modes, i.e., rapid access (forward/reverse) and visual search (forward/reverse). A digital readout 40 provides an indication of playing time and other functions, such as PAUSE, LOAD/UNLOAD and END-OF-PLAY, etc. A pair of tally lights 42 are operated to provide an indication of the record side subject to play, e.g., "SIDE 1" and "SIDE 2". A door 44 is disposed on the cover of the player to provide access to a stylus cartridge 46 which is shown in FIG. 3.

Figure 2:
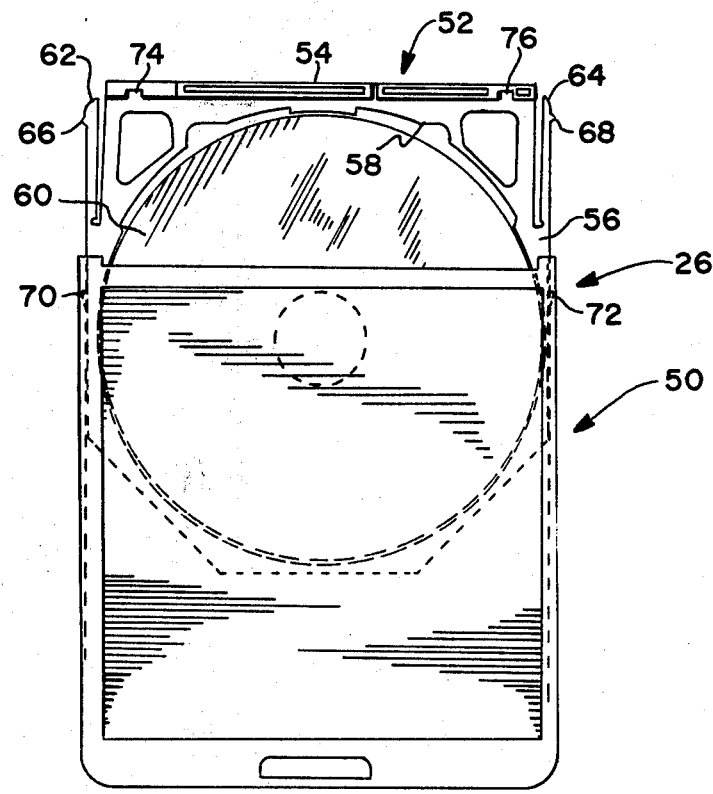
FIG. 2 illustrates a video disc caddy comprising a jacket and a record retaining spine, and suitable for use with the subject apparatus in the practice of the present invention.

As shown in FIG. 2, the video disc caddy 26 comprises a jacket 50 and a record retaining spine 52. The jacket 50 has an edge opening in communication with a cavity for enclosing the record/spine assembly. The spine 52 has a portion 54 which serves as a closure, and a further portion 56 having a circular opening 58 for receiving a centrally-apertured record 60. The spine 52 is further provided with integrally-molded, flexural latch fingers 62 and 64. Each of the spine latch fingers 62 and 64 has a protruding element 66 and 68. The protruding elements 66 and 68 are received in pockets 70 and 72 disposed in the jacket 50 for locking the spine 52 in place when it is fully inserted therein. The spine 52 is provided with cutouts 74 and 76 for receiving the spine gripper members mounted in the player to secure the spine thereto in the manner explained later.

The operation of the caddy extraction mechanism will now be explained in conjunction with FIG. 3. To load a record into the player, a caddy 26 is guided into the input slot 24 along a path defined by side rails 120 and 122. As the caddy arrives at a fully inserted position in the player, latch defeat members 124 and 126 enter the jacket 50 to defeat the spine latch fingers 62 and 64 for freeing the spine 52 from the jacket. Pivotally mounted in the player are spine gripper members 128 and 130 which are received in the respective cutouts 74 and 76, arranged in the spine 52, when the caddy arrives at the fully inserted position in the player in order to lock the spine to the player. Since the spine 52 is released from the jacket 50 through the operation of the latch defeat members 124 and 126 and is latched to the player through the operation of the spine gripper members 128 and 130, subsequent withdrawal of the jacket leaves the record/spine assembly in the player. The retained record/spine assembly is supported on a set of depressible receiving pads 132, 134, 136, 138 and 140. A pair of springs (not shown) disposed between a gripper arm 142, which carries the spine gripper members 128 and 130, and the latch defeat members 124 and 126 effect downward deflection of the latch defeat members during jacket withdrawal.

To transfer the retained record to a turntable 144, the function lever 22 is displaced to the PLAY position, which, in turn, raises the turntable and starts a turntable motor 146. A set of hold-down members 148, 150 and 152 hold the retained spine 52 in place against the receiving pads 132, 134, 136, 138 and 140 while permitting the retained record to be intercepted by the turntable 144 when it is raised. The hold-down members 148, 150 and 152 also serve to accurately locate the retained spine 52, longitudinally and laterally, in the player.

A pickup stylus 160 is disposed at one end of a stylus arm 162, the other end of which is secured to a latch plate 164 by means of a rubber coupler 166. The latch plate 164, in turn, is suspended in the cartridge 46 by means of a rubber diaphragm 168. The cartridge 46 is placed in a compartment 170 provided in a stylus arm carriage 172, and the carriage lid, not shown, is closed. Disposed in the carriage 172 is a slidably-mounted arm-stretcher transducer 174 (e.g., of the type described in U.S. Pat. No. 3,983,318) which is provided with a latch cup 176 subject to engagement with the latch plate 164. The transducer 174 is advanced in response to the closure of the cartridge lid to establish connection between the latch plate 164 and the latch cup 176.

A stylus arm lifting/lowering mechanism 178 (for example, of the general variety shown in U.S. Pat. No. 4,053,161) is mounted in the carriage 172 to selectively lower the pickup stylus 160 through an opening 180 provided in the bottom wall of the carriage to effect record engagement. During playback, the carriage 172 is translated on guide ways 182 and 184 disposed parallel to the caddy side rails 120 and 122 from a starting position at the back of the player toward the front of the player in synchronism with the radially inward motion of the pickup stylus 160 by means of a carriage drive mechanism 200 in the manner explained in detail later. The variations in capacitance between an electrode 186 carried by the stylus 160, shown in FIG. 4, and a conductive property of the record 60 are sensed to reproduce the stored information on the record. The recovered signals are processed to reconstruct a television signal containing picture and sound information for application to a television receiver.

To transfer the record back to the receiving pads 132, 134, 136, 138 and 140 after playback, the function lever 22 is depressed to the LOAD/UNLOAD position, which, in turn, lowers the turntable 144 to a level below the receiving pads. When the turntable 144 is lowered, the record is deposited on the receiving pads 132, 134, 136, 138 and 140 for reception in the opening 58 disposed in the spine 52 to redefine the record/spine assembly. When the function lever 22 is displaced to the LOAD/UNLOAD position, the turntable motor 146 is shut off and the carriage 172 is disconnected from the carriage drive mechanism 200 in the manner described in detail later. The location of the receiving pads 132, 134, 136, 138 and 140, occupying the raised position thereof, is such that the record/spine assembly is aligned with the center line of the caddy side rails 120 and 122.

In the herein-disclosed player, the turntable 144 is raised and lowered relative to the receiving pads 132, 134, 136, 138 and 140 to, respectively, transfer the record from the receiving pads to the turntable and from the turntable to the receiving pads. Alternately, the record receiving pads may be mounted on a movable platform, and the platform raised and lowered with respect to the turntable for effecting the above record interchange in the manner provided in the afore-mentioned patent applications of Torrington et al and Coleman et al (Ser. No. 964,526 and 964,643, respectively).

To retrieve the record/spine assembly, the empty jacket 50 is inserted into the player through the input slot 24 along the caddy side rails 120 and 122. As the jacket 50 arrives at the fully inserted position, the front edge thereof engages the carriage 172 to push it back to the starting position thereof at the back of the player, and further engages the already deflected latch defeat members 124 and 126 to cause further downward deflection thereof. The motion of the carriage 172 to the starting position thereof is accomplished with freedom from interference by the carriage drive mechanism 200, since the carriage is disconnected from the carriage drive mechanism in response to the depression of the function lever 22 to the LOAD/UNLOAD position in the manner described above. Moreover, the further downward deflection of the latch defeat members 124 and 126, in turn, effects downward displacement of the spine gripper members 128 and 130, whereby the spine 52 is freed from the player. When the jacket 50 is fully inserted into the player, the protruding elements 66 and 68 of the spine latch fingers 62 and 64 snap back into the pockets 70 and 72 to lock the spine 52 to the jacket. The record/spine assembly is withdrawn from the player when the caddy is extracted.

The subject carriage drive mechanism 200, including the declutching apparatus 202, will now be described in conjunction with FIGS. 5-8. The carriage drive mechanism 200 comprises an input shaft 204 rotatably mounted in a bracket 206 attached to the frame 208 of the player. An output pulley 210, consisting of a pinion portion 212 and a first clutch half portion 214, is freely mounted on the input shaft 204. The pinion 212 engages a rack 216 secured to the carriage 172, as can be seen from FIG. 5. A retaining ring 218 disposed on the input shaft 204 sets the axial position of the output pulley 210.

An intermediate pulley 220, comprising a second clutch half portion 222 disposed at one end of a sleeve portion 224, is loosely mounted on the input shaft 204 such that the clutch halves are juxtaposed. The sleeve portion 224 is provided with a pair of oppositely-disposed elongated slots 226 and 228 arranged along the axial direction. A pin 230 is driven radially through the input shaft 204 such that its ends extend through the oppositely-disposed elongated slots 226 and 228. The radial pin 230 transmits radial motion of the input shaft 204 to the intermediate pulley 220 without interfering with the axial location of the intermediate pulley 220 with respect to the input shaft within an operating range. A coil spring 232 is disposed between the pin 230, secured to the input shaft 204, and the intermediate pulley 220, rotatably coupled to the input shaft, for biasing the clutch halves into engagement with each other. It will be noted that the coil spring 232 rotates with the intermediate pulley 220 and the input shaft 204 when the clutch halves 214 and 222 are engaged, whereby the coil spring does not exert any drag on the drive mechanism while the clutch is operational.

A pair of cam halves 234 and 236 are loosely disposed on the sleeve portion 24 between the radial pin 230, mounted on the input shaft 204, and a retaining washer 238, secured to the sleeve portion 224 at the other end thereof. The cam halves 234 and 236 are dimensioned such that they do not interfere with the axial location of the retaining washer 238 when the actuating cam half 236 is disposed in a first position, shown in FIG. 6, so that the rotational motion of the input shaft 204 is transmitted to the output pulley 210 without any axial drag from the cam halves. The stationary cam half 234 is provided with an extension 240 adapted for reception in a slot 242 arranged in the mounting bracket 206. Integrally disposed on the actuating cam half 236 is a lever 244 which is operated by the function lever 22 by means of a link 246, as shown in FIG. 3. When the function lever 22 is depressed to the LOAD/UNLOAD position, for example, prior to the insertion of an empty jacket into the player for record retrieval, the operating lever 244 is pushed back, thereby rotating the actuating cam half 236 through an arc. The rotation of the actuating cam half 236 causes the cam halves to separate. Since the axial motion of the stationary cam half 234 is prevented by the radial pin 230, secured to the input shaft 204, the rotation of the actuating cam half 236 causes axial displacement of the retaining washer 238, secured to the intermediate pulley 220, in a direction away from the radial pin, whereby the clutch halves 214 and 222 are disengaged from each other. The carriage 172 is free to move without hindrance by the carriage drive mechanism 200 when the clutch halves 214 and 222 are disengaged.

Disposed on the input shaft 204 is a worm wheel 250 which is driven by a worm gear 252. The worm gear 252 is, in turn, driven by a carriage drive motor 254 via a gear reduction arrangement 256. The rotational speed of the carriage drive motor 254 is selected such that the carriage 172 follows the pickup stylus 160 across the record during playback.

What is claimed is:

1. In a player for recovering prerecorded signals from a turntable-supported disc record by means of a signal pickup when pickup/record relative motion is established during playback; said signal pickup being disposed in a translatable carriage; a carriage drive apparatus comprising:
  (A) an input shaft rotatably mounted in said player;
  (b) a first member loosely mounted on sand having a first clutch portion; said first member being coupled to said carriage;
  (c) a second member consisting of a second clutch portion disposed at one end of a sleeve portion; said second member being loosely mounted on said shaft such that said clutch portions are juxtaposed; said sleeve portion having an elongated slot disposed in a direction parallel to said shaft;
  (d) a pin fixedly secured to said shaft and extending through said elongated slot in said sleeve portion for coupling the rotational motion of said shaft to said second member without interfering with the axial location of said second member relative to said shaft;
  (E) a spring disposed between said pin secured to said shaft and said second member rotatably coupled to said shaft for biasing said clutch portions in engagement with each other;
  (F) means for rotating said input shaft at a speed such that said carriage, coupled to said first member, follows the motion of said signal pickup across said record; and
  (G) means for selectively displacing said second member in a direction causing said clutch portions to disengage to permit motion of said carriage with freedom from hindrance by said carriage drive apparatus.

2. Apparatus as defined in claim 1 wherein said selectively displacing means comprises:
  (A) a retaining member fixedly secured to said sleeve portion of said second member at the other end thereof; and
  (B) a cam member comprising a stationary cam half and an actuated cam half; said cam halves being loosely mounted on said sleeve portion between said pin secured to said shaft and said retaining member secured to said second member; said cam halves being dimensioned such that they do not interfere with the axial location of said retaining member when said actuated cam half is disposed in a first position thereof, whereby the rotational motion of said input shaft is transmitted to said first member by means of said clutch portions free from interference by cam halves; the motion of said actuated cam half to a second position effecting displacement of said retaining member secured to said second member in a direction causing said disengagement of said clutch portions.

3. Apparatus as defined in claim 2 wherein an extension is disposed on said stationary cam half; said extension being subject to engagement with a stop disposed in said player to prevent the rotation of said stationary cam half.

4. Apparatus as defined in claim 3 wherein a lever is disposed on said actuated element; the operation of said lever effecting said disengagement of said clutch portions.

* * * * *

UNITED STATES PATENT AND TRADEMARK OFFICE
CERTIFICATE OF CORRECTION

PATENT NO. : 4,325,136
DATED : April 13, 1982
INVENTOR(S) : Philip Edmund O'Connell, et al.

It is certified that error appears in the above—identified patent and that said Letters Patent is hereby corrected as shown below:

Col. 3, line 10, "132, 134, 138 and 140" should read
 --132, 134, 136, 138, and 140-- (that is, insert 136).

Col 5, line 10, "24" should read --224--.

Signed and Sealed this

Thirty-first Day of August 1982

[SEAL]

Attest:

GERALD J. MOSSINGHOFF

Attesting Officer

Commissioner of Patents and Trademarks